INVENTOR
J. D. BISHOP
BY
ATTORNEY

Oct. 10, 1967  J. D. BISHOP  3,346,855
CIRCUIT FOR MONITORING THE STATE OF A RELAY
Filed May 18, 1964  2 Sheets-Sheet 2

United States Patent Office 3,346,855
Patented Oct. 10, 1967

3,346,855
CIRCUIT FOR MONITORING THE STATE
OF A RELAY
John D. Bishop, Basking Ridge, N.J., assignor to Bell Telephone Laboratories, Incorporated, New York, N.Y., a corporation of New York
Filed May 18, 1964, Ser. No. 368,233
6 Claims. (Cl. 340—248)

This invention relates to monitoring equipment and more particularly to electrical circuitry that monitors the condition of a relay in order to actuate an indicator.

Generally, it is an easy matter to monitor the condition of a relay for the purpose of actuating an indicator. Closure of contacts associated with the relay to be monitored completes an electrical circuit that energizes the indicator. Application of this straightforward technique, however, gives rise to acute problems when the control coil of the relay to be monitored is energized by a high voltage source and for some reason the indicator is required to be energized by a low voltage source. Under these conditions provision must be made for the relay to maintain without dielectric breakdown the high potential difference between its contacts and control coil. Thus, the relay itself must act to isolate the high voltage circuit including the control coil from the low voltage circuit including the indicator. Presently available relays having sufficient insulation between their contacts and control coil to withstand such a high potential difference are expensive and bulky.

It is therefore the object of this invention to reduce the cost and size of circuitry that monitors the condition of a relay having a high direct-current voltage impressed upon its control coil, in order to actuate an indicator energized by a low voltage source.

In accordance with this object, direct-current voltage isolation of the high voltage circuit including the relay control coil from the low voltage circuit including the indicator is provided between the primary and secondary windings of a transformer. Available transformers capable of maintaining high potential differences are smaller in size and less expensive than available relays having the same property.

The isolating transformer has a center-tapped primary winding. The contacts of the relay to be monitored are connected to the high voltage circuit so as to be at the same potential as this circuit. When the relay is in one state, the output of a source of periodic signals is impressed upon one half of the primary of the transformer through a circuit including one set of the relay's contacts and is transmitted to the secondary circuit of the transformer in one phase. When the relay is in the other state, the output of the source of periodic signals is impressed upon the other half of the primary through a circuit including another set of the relay's contacts and is transmitted to the secondary circuit in opposite phase. Comparison of the phase of the periodic signal transmitted to the secondary circuit and the output of the source signifies the state of the relay.

Specifically, phase comparison can be accomplished by employing a transformer secondary circuit comprising two windings, each coupled to a coincidence circuit and a periodic signal source producing square-wave pulses. The output of the pulse source is coupled directly to the coincidence circuits. A second transformer couples the square-wave pulses to the high voltage circuit so that isolation of the high voltage circuit from the low voltage circuit by way of the square-wave pulse source exists. Either the directly-coupled output of the pulse source or the secondary windings are connected to the two coincidence circuits in opposite phase relationship. As a result, when the relay is in one state, the pulses transmitted to the secondaries coincide with the pulses coupled directly to one of the coincidence circuits, and that coincidence circuit transmits the applied pulses, thereby actuating the indicator to show the relay state. At the same time, the pulses transmitted to the other secondary are out of phase with the pulses applied directly to the other coincidence circuit, and that coincidence circuit blocks transmission of the applied pulses. When the relay is in the other state the roles of the coincidence circuits are reversed, with the second coincidence circuit transmitting pulses, thereby actuating the indicator to show a different relay state.

These and other features of the invention will become more apparent from consideration of the following detailed description taken in conjunction with the drawings in which.

Figure 1:
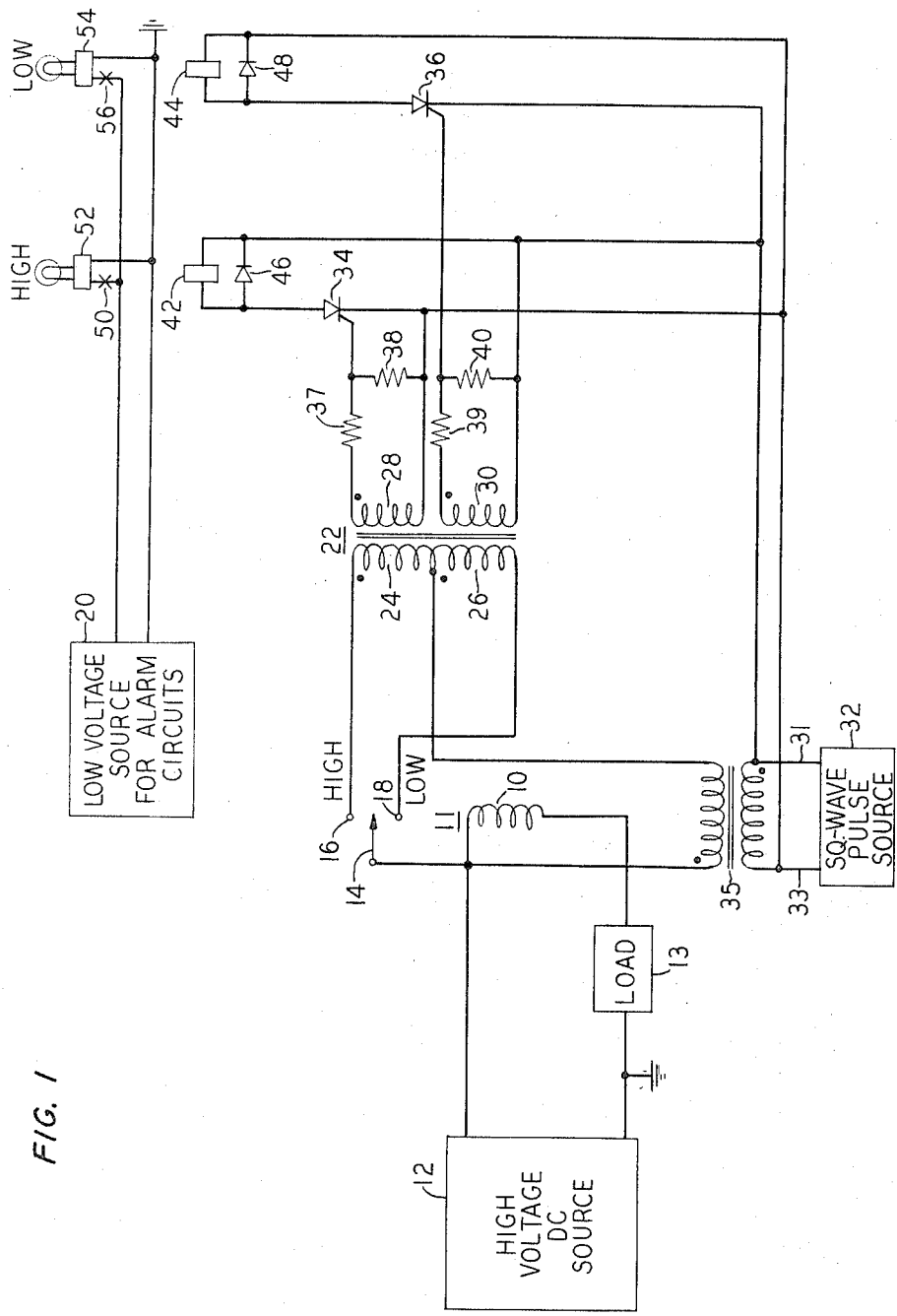
FIG. 1 is a schematic circuit diagram arranged according to the invention.

In FIG. 1 a control coil 10 of a relay 11 is shown connected to the output of a high voltage, direct-current source 12. A low voltage source 20 is employed to energize an indicator to show the state of relay 11. An exemplary setting for this apparatus is a submarine cable system which is joined to a conventional land-based telephone system. Direct-current source 12 in such a system is the cable's power plant, which must provide a high voltage output. Relay 11 in this particular setting is of the so-called meter or instrument type (for example, Weston relay Model 534) and serves to sense the current from source 12. Coil 10 controls the motion of a movable contact 14 causing it to close a circuit through a fixed contact 16 when the current from source 12 exceeds a predetermined upper limit and to close a circuit through a fixed contact 18 when the current from source 12 falls below a predetermined lower limit. In this system, alarms in a central office of the telephone system are energized by the standard low voltage, direct-current source available at the central office, i.e., source 20, and are actuated in the event that the output current from source 12 rises above or falls below the predetermined limits.

Figure 2:
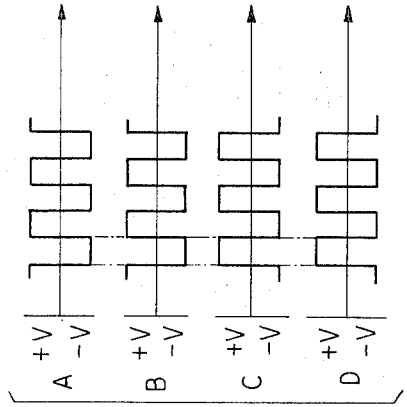
FIGS. 2A through 2D are graphs representing certain wave forms to be used in explaining the mode of operation of the circuitry disclosed in FIG. 1.

To monitor the state of relay 11, energized by high voltage source 12, in order to operate indicator or alarm circuitry energized by low voltage source 20, a transformer 22 is employed to isolate the relay circuitry from the indicator circuitry. Transformer 22 has a center-tapped primary winding forming sections 24 and 26 and has secondary windings 28 and 30. Movable contact 14 is connected to one terminal of control coil 10 so that the entire primary circuit of transformer 22 and the contacts of relay 11 are maintained at the high direct-current voltage of source 12. The output of a source 32 of bipolar, square-wave pulses that appear on leads 31 and 33 is coupled by a transformer 35 to movable contact 14 and the center tap of the primary winding of transformer 22. Transformer 35 also serves to isolate the relay circuitry from the indicator circuitry because source 32 is coupled to the seconday circuit of transformer 22 as well as the primary circuit of transformer 22. Alternatively, two independent pulse sources whose outputs are phase synchronized or a transformer that couples source 32 to the secondary circuit could be used for isolation in lieu of the isolating circuitry shown. When contact pair 14–16 is made, section 24 is energized, and pulses are transmitted to windings 28 and 30 in one phase, as shown in FIG. 2B. When contact pair 14–18 is made, section 26 is energized, and pulses are transmitted to secondary windings 28 and 30 in the opposite phase, as shown in FIG. 2C.

Secondary windings 28 and 30 are connected between the gate terminal and the cathode of silicon controlled rectifiers 34 and 36, respectively, which operate as coincidence circuits. Windings 28 and 30, as indicated by the position of the polarity dots associated with them, are connected to prime silicon controlled rectifiers 34 and 36 concurrently for assumption of high conduction states. A current-limiting resistor 37 is connected between winding 28 and the gate terminal of silicon controlled rectifier 34, and a current-limiting resistor 39 is connected between winding 30 and the gate terminal of silicon controlled rectifier 36. Resistors 38 and 40, shunting controlled rectifiers 34 and 36, respectively, insure their consistent operation. The anode and cathode of silicon controlled rectifiers 34 and 36 are connected in series with relay control coils 42 and 44, respectively, in opposite phase relationship across the output of source 32. Lead 31 is connected through control coil 42 to the anode of controlled rectifier 34 and directly to the cathode of controlled rectifier 36. Lead 33 is connected through control coil 44 to the anode of controlled rectifier 36 and directly to the cathode of controlled rectifier 34. The voltage appearing at the anode of controlled rectifier 34 is illustrated in FIG. 2A and the voltage appearing at the anode of controlled rectifier 36 is illustrated in FIG. 2D. As shown by FIGS. 2A and 2D, the output of pulse source 32 is applied directly to controlled rectifiers 34 and 36 in opposite phase relationship.

In operation, when the direct-current output current of source 12 exceeds a predetermined value, this condition is detected by relay 11 which closes contact pair 14–16. In this case, the pulses applied between the gate terminal and cathode of rectifier 34 coincide with the pulses applied between the anode and cathode of rectifier 34 directly by source 32 and transmission of the pulses through control coil 42 results. On the other hand, when the direct-current output current of source 12 drops below a predetermined value, relay 11 senses this condition by the making of contact pair 14–18. In this case, the pulses applied between the gate terminal and the cathode of rectifier 36 coincide with the pulses applied across the anode and cathode of rectifier 36 directly by source 32 and transmission through control coil 44 takes place. When the current of source 12 is within the predetermined limits, no pulses are applied between the gate terminal and cathode of either rectifier and consequently neither of control coils 42 or 44 is energized. Instead of connecting the output of source 32 in opposite phase relationship across the anode and cathode of rectifiers 34 and 36, the secondaries of transformer 22 can be connected in opposite phase relationship across the cathode and gate terminal, In other words, the connections of one of the secondaries of transformer 22 to its respective rectifier are reversed, and the connections of source 32 to one of the silicon controlled rectifiers are reversed.

Diodes 46 and 48 are connected in parallel with coils 42 and 44, respectively, to maintain current flow through these coils between pulses during periods in which either coil is energized.

Figure 3:
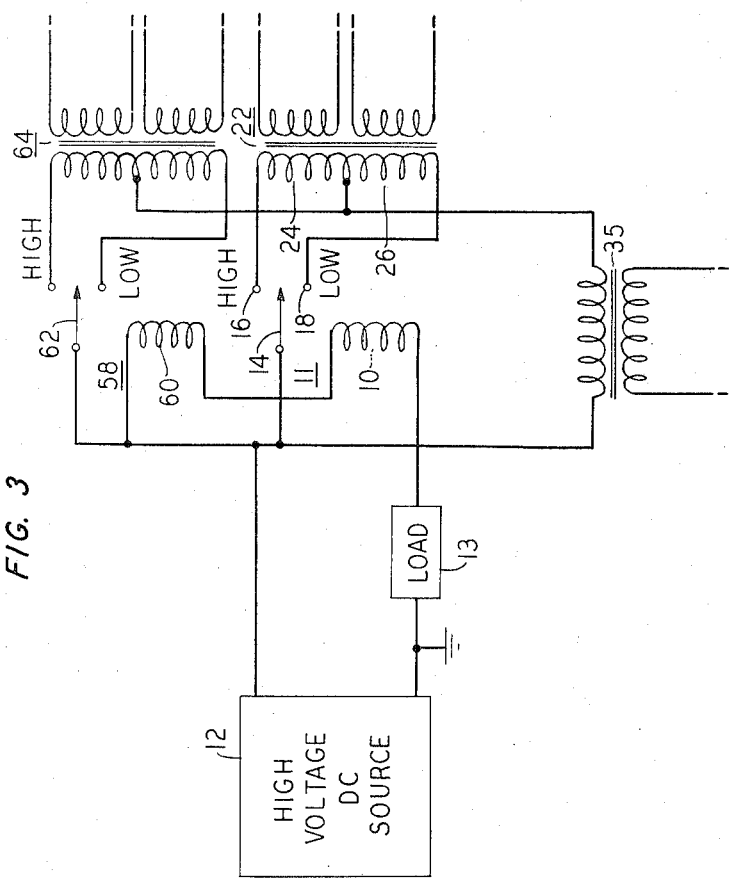
FIG. 3 is a schematic circuit diagram of a modification of the arrangement illustrated in FIG. 1.

The central office alarm circuit includes a make contact 50 controlled by coil 42 and an indicator lamp 52 that are connected in series across the output of source 20 and includes a make contact 56 controlled by coil 44 and an indicator lamp 54 that are also connected in series across source 20. When either coil 42 or 44 is energized, its corresponding indicator lamp 52 or 54 is also energized to show that relay 11 is either in a high or a low state. FIG. 3 discloses an arrangement employing, in addition to the components of FIG. 1, a relay 58 having a control coil 60 connected in series with control coil 10 of relay 11 and having a movable contact 62 connected to movable contact 14 of relay 11. Relay 58 is actuated when the current from source 12 exceeds limits different from those which actuate relay 11. The state of relay 58 is monitored by circuitry connected to the secondaries of a transformer 64 and identical to the circuitry shown in FIG. 1 as connected to the secondaries of transformer 22. Similarly, any number of relays whose control coils are connected in common with the high voltage side of source 12 can be monitored by connecting their movable contacts to contact 14 and duplicating the circuitry shown in FIG. 1.

What is claimed is:

1. Apparatus for monitoring the condition of a relay comprising a transformer having a primary circuit and a secondary circuit, a periodic signal source, means for coupling the output of said source to said primary circuit so as to transmit the periodic signal to said secondary circuit in one phase when said relay is in a first state and for coupling the output of said source to said primary circuit so as to transmit the periodic signal to said secondary circuit in an opposite phase when said relay is in a second state, means for comparing the phase of the signal transmitted to said secondary circuit with the output of said source, said comparing means including first and second coincidence detection means coupled to said secondary circuit, means to directly couple one phase and the opposite phase of the output of said periodic signal source to said first and second coincidence detection means, respectively, one of said first and second coincidence detection means being exclusively operated in response to the periodic signal transmitted to said secondary circuit, and means responsive to said comparing means for indicating the state of said relay.

2. Apparatus for monitoring the state of a relay having a control coil, a first set of contacts closed when said relay is in a first state, and a second set of contacts closed when said relay is in a second state, said apparatus comprising a transformer having a primary circuit with two end terminals and an intermediate tap and having a secondary circuit, a periodic signal source, a circuit path permanently connecting one terminal of said source to said intermediate tap, a circuit path completed by closure of said first set of contacts for connecting the other terminal of said source to one end terminal of said primary circuit when said relay is in said first state, a circuit path completed by closure of said second set of contacts for connecting said other terminal of said source to the other end terminal of said primary circuit when said relay is in said second state, means for comparing the phase of the signal transmitted to said secondary circuit with the output of said source, and means responsive to said comparing means for indicating the state of said relay.

3. In combination, a relay having a control coil common to a high voltage, having first contact means closed when said relay is in a first state, and having second contact means closed when said relay is in a second state and means for monitoring the state of said relay comprising a transformer having a primary winding with two end terminals and an intermediate tap and having first and second secondary windings, an isolated square-wave source having first and second output terminals, a circuit path permanently connecting said first output terminal of said square-wave source to said intermediate tap, a circuit path including said first set of contacts for connecting said square-wave source to one end terminal of said primary winding when said relay is in said first state, a circuit path including said second set of contacts for connecting said square-wave source to the other end terminal of said primary winding when said relay is in said second state, a coincidence circuit corresponding to each of said secondary windings, means for directly connecting said square-wave source in opposite phase relationship to the inputs of said coincidence circuits, means for connecting said secondary windings in the same phase relationship to their corresponding coincidence circuits, and means for detecting operation of said coincidence circuits.

4. In combination, a relay having a control coil common to a high direct-current voltage and contact means maintained at approximately the same direct-current voltage, said contact means being capable of assuming one of at least two states depending upon the current passing through said control coil, and means for monitoring the state of said relay comprising a transformer having a center-tapped primary winding forming first and second sections and having first and second secondary windings, an isolated source of periodic signals, circuit means including said contact means for connecting said source to said first section when said relay is in one state and for connecting said source to said second section when said relay is in the other state, said sections transmitting said periodic signal to said secondary windings in opposite phase relationship, a coincidence circuit corresponding to each of said secondary windings, means for directly connecting said source in opposite phase relationship to the inputs of said coincidence circuits, means for connecting said secondary windings in the same phase relationship to their corresponding coincidence circuits, and means for detecting operation of said coincidence circuits.

5. In combination, a high voltage source having an ungrounded terminal and a grounded terminal; a relay having a control coil, a first fixed contact, a second fixed contact, and a movable contact capable of closing a circuit to either said first or said second fixed contact under the control of said coil; a transformer having a primary winding with two end terminals and a center tap and having two secondary windings; a source of square-wave pulses having first and second output terminals; means connecting said first output terminal of said square-wave pulse source to said center tap; means connecting said control coil across said terminals of said high voltage source; means connecting said movable contact to said ungrounded terminal of said high voltage source; means connecting said second terminal of said pulse source to said movable contact; means connecting said first and second fixed contacts to said end terminals, respectively, of said primary winding; first and second controlled rectifiers each having an anode, a cathode, and a gate terminal; means connecting each of said secondary windings between the gate terminal and anode of a different one of said controlled rectifiers; means connecting said anode of said first controlled rectifier and said cathode of said second controlled rectifier to said first terminal of said pulse source, means connecting said cathode of said first controlled rectifier and said anode of said second controlled rectifier to said second terminal of said pulse source, and means connected in series with each of said controlled rectifiers between the output terminals of said pulse source for indicating the state of said relay.

6. In combination, a plurality of relays each having a control coil and contact means, said control coils being common to a high direct-current voltage, means for connecting said contact means of all of said relays together and maintaining them at approximately said direct-current voltage, each of said contact means being capable of assuming one of at least two states depending upon the current passing through its respective control coil, and means individual to each of said relays for monitoring the state of said relay comprising a transformer having a center-tapped primary winding forming first and second sections and having primary and secondary windings, an isolated source of periodic signals, circuit means including said contact means for connecting said source to said first section when said relay is in one state and for connecting said source to said second section when said relay is in the other state, said sections transmitting said periodic signal to said secondary windings in opposite phase relationship, means for comparing the phase of the signal transmitted to said secondary windings with the output of said source, and means responsive to said comparing means for indicating the state of said relay.

References Cited

UNITED STATES PATENTS

| | | |
|---|---|---|
| 1,571,034 | 1/1926 | Young. |
| 1,895,542 | 1/1933 | Deardorff _____ 340—253 |
| 2,260,160 | 10/1941 | Benning et al. |
| 2,298,956 | 10/1942 | Mason _____ 324—78 X |
| 3,148,287 | 9/1964 | Bauer et al. _____ 307—127 |

NEIL C. READ, *Primary Examiner.*

D. MYER, *Assistant Examiner.*